United States Patent [19]

Suzuki

[11] 4,286,281
[45] Aug. 25, 1981

[54] VIDEO FORMAT SIGNAL RECORDING AND REPRODUCING DEVICE

[75] Inventor: Tsutomu Suzuki, Tokorozawa, Japan

[73] Assignee: Pioneer Electronic Corporation, Tokyo, Japan

[21] Appl. No.: 79,006

[22] Filed: Sep. 26, 1979

[30] Foreign Application Priority Data

| Sep. 30, 1978 | [JP] | Japan | 53-120827 |
| Sep. 30, 1978 | [JP] | Japan | 53-120829 |
| Oct. 4, 1978 | [JP] | Japan | 53-122895 |
| Oct. 5, 1978 | [JP] | Japan | 53-123069 |
| Oct. 5, 1978 | [JP] | Japan | 53-123070 |
| Oct. 5, 1978 | [JP] | Japan | 53-123072 |
| Nov. 9, 1978 | [JP] | Japan | 53-138199 |
| Nov. 9, 1978 | [JP] | Japan | 53-138200 |
| Feb. 28, 1979 | [JP] | Japan | 54-23926 |

[51] Int. Cl.³ .............................................. H04N 5/76
[52] U.S. Cl. ................................. 358/4; 358/128.6; 358/147; 360/19
[58] Field of Search ................ 358/4, 128.5, 128.6, 358/147; 360/8, 9, 10, 19, 27, 37

[56] References Cited

U.S. PATENT DOCUMENTS

| 3,789,137 | 1/1974 | Newell | 360/8 |
| 4,065,795 | 12/1977 | Shutterly | 360/19 X |
| 4,110,800 | 8/1978 | Rotter et al. | 360/19 X |
| 4,134,127 | 1/1979 | Campioni | 358/147 X |
| 4,142,209 | 2/1979 | Hedlund et al. | 358/128.5 |

Primary Examiner—Bernard Konick
Assistant Examiner—Donald McElheny, Jr.
Attorney, Agent, or Firm—Sughrue, Rothwell, Mion, Zinn and Macpeak

[57] ABSTRACT

A video format signal recording and reproducing device in which an identification signal is inserted into each frame of the video format signal for identifying whether the corresponding data is video or audio data. The identification signal may further be capable of indicating whether corresponding video data is still picture data or motion picture data. In this case, the identification signal may be implemented as a color burst signal with the number of cycles within the burst set in accordance with whether the corresponding video data is still picture or motion picture data. The color burst signal is also inserted in each frame containing audio data so that there is no loss of color synchronization when audio frame data is being read from the recording medium.

9 Claims, 16 Drawing Figures

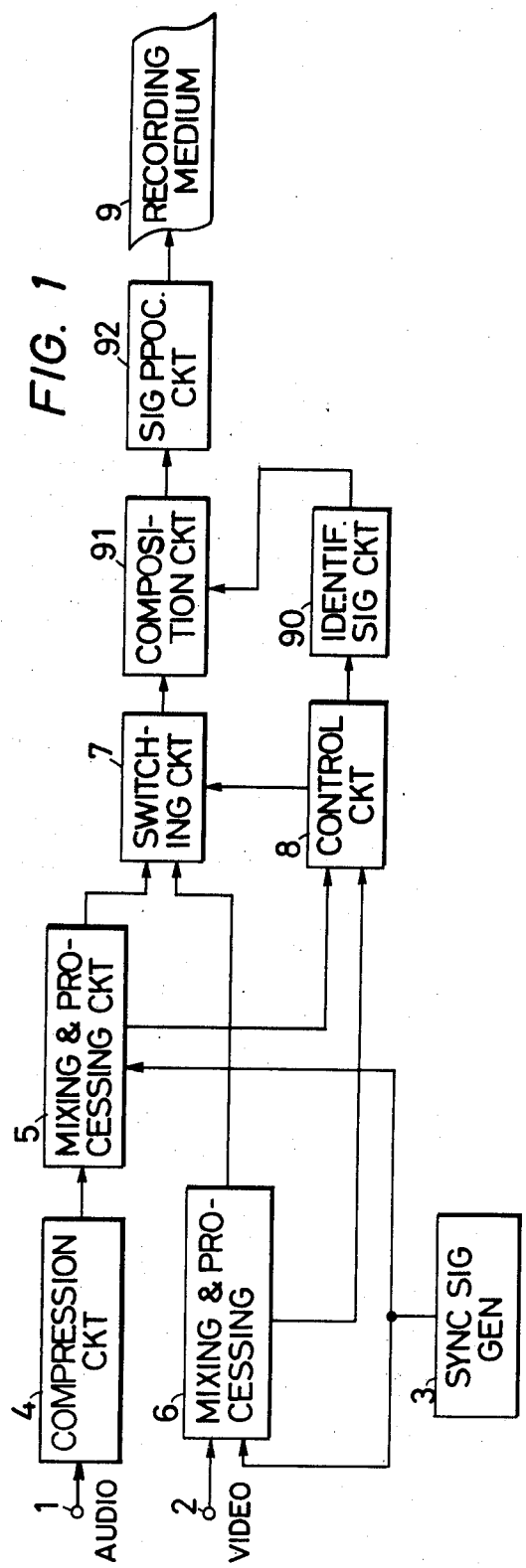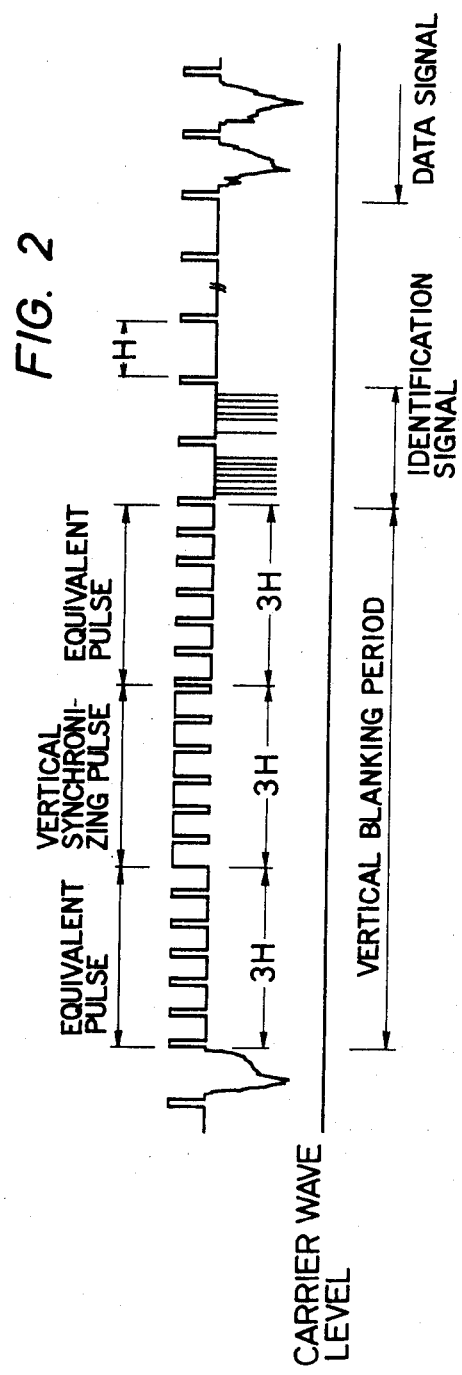

VIDEO FORMAT SIGNAL RECORDING AND REPRODUCING DEVICE

DESCRIPTION OF THE PRIOR ART

The invention relates to devices for recording and reproducing a video format signal including both video and audio data.

In a compound video signal, the video format signal includes a series of frame signals each of which has a data signal component or portion including both video and audio data, a horizontal and vertical synchronizing signal portion, and a horizontal and vertical blanking signal portion. In general, each frame signal has a pair of field signals.

A VTR (Video Tape Recorder) or a VDR (Video Disc Recorder) is well-known in the art as a device with which such a video format signal may be recorded on a recording medium such as a video tape or a video disc after being subjected to signal processing such as FM modulation with the signal thereafter reproduced at a desired place and time.

The reproducing system employed for the video data signal portion of the video format signal is different from that employed for the audio data signal portion of the video format signal. Therefore, it is always necessary to identify whether any one portion of the stored contents is video data or audio data.

A method has been previously known in which an identification signal for performing such identification is inserted in each frame of the video format signal so as to make it possible in the reproduction operation to identify whether the contents are video data or audio data. Furthermore, a method has been known in which the arrangement order of audio frames and video frames is determined in advance so that reproduction is carried in accordance with the pre-arrangement order. However, in a conventional video format signal reproducing system, it has heretofore proven difficult to perform such an identification within the reproducing device itself and the circuitry utilized has been complex and costly.

Accordingly, an object of the invention is to provide a video format signal recording and reproducing device in which a recorded video format signal containing both video and audio data can be correctly reproduced.

BRIEF DESCRIPTION OF THE DRAWINGS

FIG. 1 is a block diagram of a video format signal recording device of the invention;

FIG. 2 is a timing diagram showing an example of an output signal from the composition circuit of the video format recording device of FIG. 1;

SUMMARY OF THE INVENTION

Figure 3:
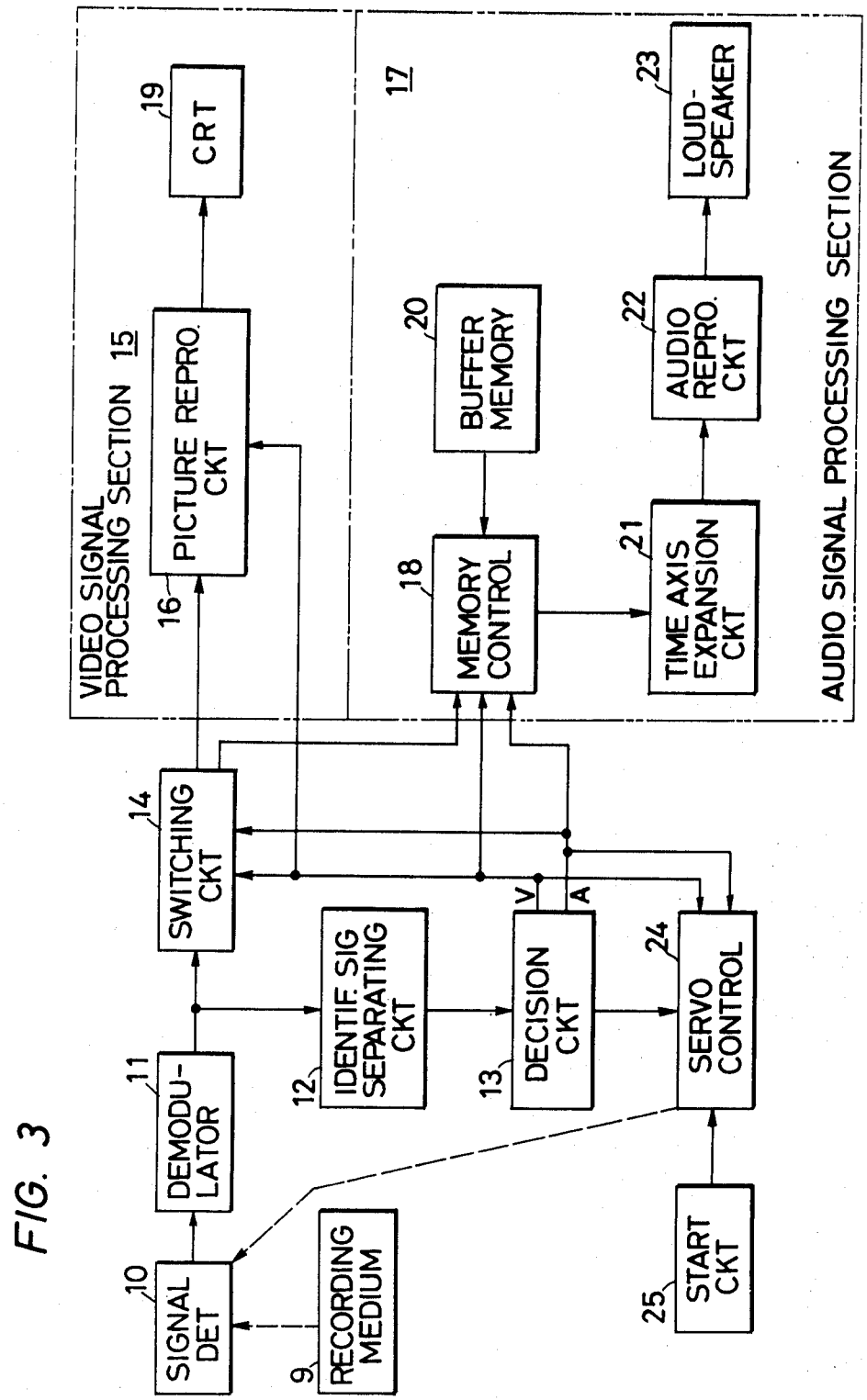
FIG. 3 is a block diagram of a video format reproduction device which is adapted for reproducing signals recorded by the device of FIG. 1.

This, as well as other objects of the invention, may be met by a video format signal recording device for recording a video format signal on a recording medium including means for inserting an identification signal in a blanking portion of each frame of the video format signal, the identification signal being capable of identifying whether the data within the frame to which it corresponds is video data or audio data.

Also, the invention can be practiced by a video format signal reproducing device including means for detecting a video format signal including an identification signal recorded on a recording medium, means for separating the identification signal from the video format signal, a decision circuit for providing a video data decision signal or an audio data decision signal according to the state of the identification signal thus separated, video signal processing means for reproducing video portions of the video format signal, audio signal processing means for reproducing audio portions of the video format signal, and switching means for supplying the video format signal to the video signal processing means and the audio signal processing means separately in response to the video data decision signal and the audio data decision signal. There may further be provided control means for controlling the signal detecting means in response to the video data decision signal and the audio data decision signal. Also, there may be provided means coupled to the audio signal processing means for muting an output audio signal during times while no audio data decision signal is present. There may also be provided means for counting the number of cycles of a color burst signal wherein the recording medium is scanned in a first mode suitable for reproducing still picture data is response to a first count output of the counting means and in a second mode for reproducing motion picture data for a second count output of the counting means.

Furthermore, within the recording device of the invention, there may be included means for inserting a first video identifying signal corresponding to motion picture data and means for inserting a second video identifying signal corresponding to still picture data. As an example, the first and second video identifying signals may be first and second numbers of cycles of a color burst signal. The color burst signal may also be inserted into frames corresponding to audio data.

DESCRIPTION OF THE PREFERRED EMBODIMENTS

A preferred first embodiment of the invention will be described with reference to the accompanying drawings. FIG. 1 is a block diagram of a video format signal recording device according to the invention. Audio data or a sampled signal which is produced by sampling the audio data at certain intervals or a digital signal produced by quantizing the audio data is applied to an input terminal 1 while video data from a camera or the like is applied to another input terminal 2. The audio data applied to the input terminal 1 is subjected to compression by an audio compression circuit 4 and is thereafter mixed with a synchronous signal provided by a synchronous signal generating circuit 3 in a synchronous signal mixing and processing circuit 5. Similarly, the video signal applied to the input terminal 2 is mixed with the synchronous signal in a synchronous signal mixing and processing circuit 6 and is then applied to a switching circuit 7. A control circuit 8, receiving data from the synchronous signal mixing and processing circuits 5 and 6, operates the switching circuit 7 so that the latter delivers in a suitable order the audio data corresponding to the processed video data and generates a control signal to control the operation of an identification signal generating circuit 90 which generates an identification signal for indicating whether the applied data is audio or video data. The control circuit 8 controls the switching circuit 7 and the identification signal generating circuit 90 using a sequence controller such as a microcomputer so as to cause the video and audio data which are continuously supplied in a programmed order to be applied as series data to a composition circuit 91 in which the identification signal, which is inserted in the blanking portion, is coupled out as a compound video format signal in which the audio and video data identification signals are suitably combined. The compound video format signal is applied to a signal processing circuit 92 where it may be further modified as desired in a particular application and the signal thus treated is recorded on a recording medium 9. The above-described identification signal generating circuit 90 may be so designed that an audio completion indicating signal is inserted in the last of a series of audio frames.

FIG. 2 a timing diagram showing one example of an output signal from the composition circuit 91. In this case, the identification signal is superimposed on or inserted between the 10th and 12th horizontal synchoronizing signals in the vertical blanking period. The video format signal thus produced is then processed in the signal processing circuit 92 and is subsequently recorded on the recording medium such as a video tape or a video disc. The audio completion indicating signal can be inserted suitably in the blanking portion or the data signal portion of the last of a series of audio frames.

FIG. 3 shows a reproducing device adapted to reproduce a video format signal which has been recorded by the recording device in FIG. 1. A signal detector 10 produces an electrical signal corresponding to the signal recorded on the recording medium 9 and couples this signal to a demodulation circuit 11. The function of the demodulation circuit 11 is opposite that of the signal processing circuit 92 in the recording device in FIG. 1. That is, it is the function of the demodulation circuit 11 to reproduce the video format signal including the identification signal. An identification signal separating circuit 12 separates the identification signal from the video format signal and applies the identification signal thus separated to a decision circuit 13. The decision circuit 13 applies a video data decision signal (hereinafter referred to merely as a "V" signal when applicable) to an output terminal V or an audio data decision signal (hereinafter referred to merely as an "A" signal when applicable) to an output terminal A depending on the state of the identification signal. A switching circuit 14 supplies the video format signal from the demodulation circuit to a picture reproducing circuit 16 in a video signal processing section 15 when it receives the V signal. Furthermore, the switching circuit 14 supplies the video format signal to a memory control circuit 18 in an audio signal processing section 17 when it receives the A signal. The picture reproducing circuit 16 carries out the reproduction operation by driving a display device such as a cathode-ray tube (CRT) 19 while receiving the V signal from the decision circuit 13.

The memory control circuit 18 causes a buffer memory 20 to store the contents of the video format signal while receiving the A signal and supplies the contents of the buffer memory 20 to a time axis expansion circuit 21 upon receipt of the V signal. An output audio data signal from the time axis expansion circuit 21 is converted into a reproduced signal by an audio reproduction circuit 22 the output of which is coupled to a loudspeaker 23.

A servo control circuit 24 operates in response to a start signal from a start circuit 25 to control the drive mechanism of the detection means 10 in accordance with the states of the V and A signals.

Another embodiment of the invention will be described with reference to FIG. 4. A color video format signal is correctly reproduced by discriminating whether the color video format signal should be reproduced as a still picture, a moving picture, or an audio signal. In this embodiment, a video signal and an audio signal are discriminated by detecting the presence or absence of a color burst signal in each frame of the color video format signal.

Figure 4:
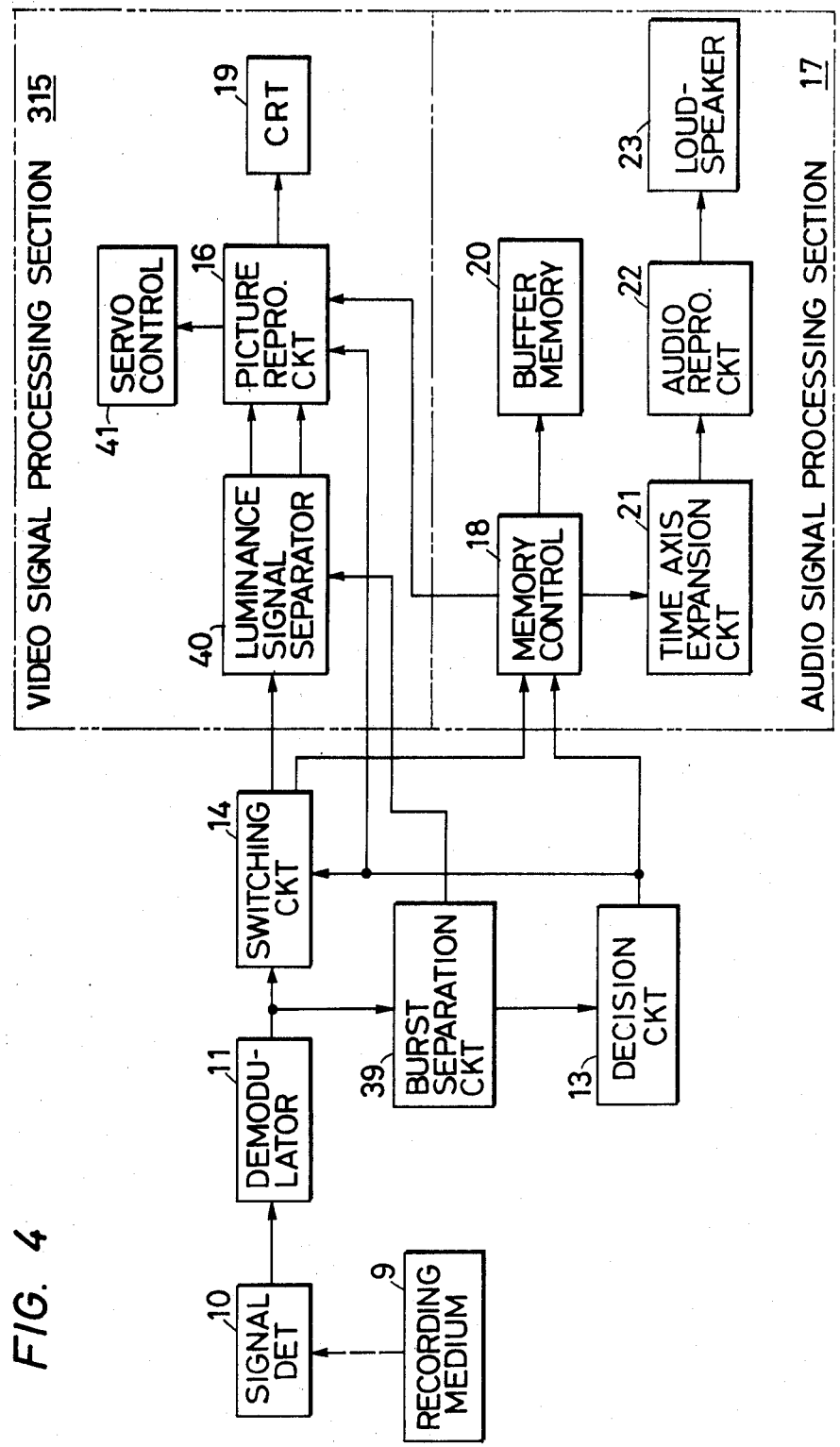
FIG. 4 is a block diagram of a second embodiment of a reproducing device of the invention.

In the circuit shown in FIG. 4, an electrical signal provided by a recording medium 9 is applied to a demodulation circuit 11 where it is converted into a color video format signal. If a color burst signal is present in the horizontal blanking period of a frame of the color video format signal, then the frame includes a color video signal. When a color burst signal is sensed in a color video format signal from the demodulator 11, a burst separation circuit 30 supplies the color burst signal to a decision circuit 13. In the decision circuit 13, after the presence of the color burst signal has been detected, a decision signal is generated and applied to a switching circuit 14. Upon receipt of the decision signal, the switching circuit 14 supplies the color video format signal to a luminance signal separation circuit 40 in a video signal processing section 315 adapted to process a video format signal as a video signal. In the case when no decision signal is applied to the switching circuit 14, the latter supplies the color video format signal to a memory control circuit 18 in an audio signal processing section 17 adapted to process a video format signal as an audio signal. The luminance signal separation circuit 40 separates the chrominance signal portion of the video format signal from the luminance signal portion using the burst signal thereby separately supplying the luminance signal and the chrominance signal to a picture reproducing circuit 16. The picture reproducing circuit 16 controls a display device such as a cathode-ray tube (CRT) 19 with suitable timing as produced in response to the decision signal and simultaneously controls a servo control circuit 41 which is provided for properly maintaining the relative displacement of the recording medium and the detector.

If a video format signal is applied to the memory control circuit 18, then the memory control circuit 18 causes the buffer memory 20 to store the video format signal. Upon receipt of the decision signal from the decision circuit 13, the memory control circuit 18 supplies the video format signal from the buffer memory 20 to the audio reproducing circuit 22 also activating the time axis expansion circuit 21 for subjecting the video format signal to time axis expansion as the video format signal in the buffer memory 20 has of course been subjected to time axis compression. The audio reproducing circuit 22 supplies the reproduced audio signal to a loudspeaker 23.

During this period, the switching circuit 14, which has received the decision signal, supplies the video format signal to the video signal processing section 315. As a result, the picture reproducing circuit 16 activates the servo control circuit 41 so that one track of the recording medium is repeatedly scanned until the picture reproducing circuit 16 receives a completion signal from the memory control circuit.

The reproducing device for reproducing the video format signal which has been recorded by the recording device shown in FIG. 1, has been described with reference to FIGS. 3 and 4. In the case of reproducing a video format signal in which video data and audio data are mixed, in practice it is difficult to instantaneously switch the reproduction system between the video and audio modes because of the circuit response delays at the like. Especially, immediately following initiation of a color picture reproduction operation after having completed an audio data detection operation, the reproduced picture may thus suffer from color phase irregularity.

Figure 5:
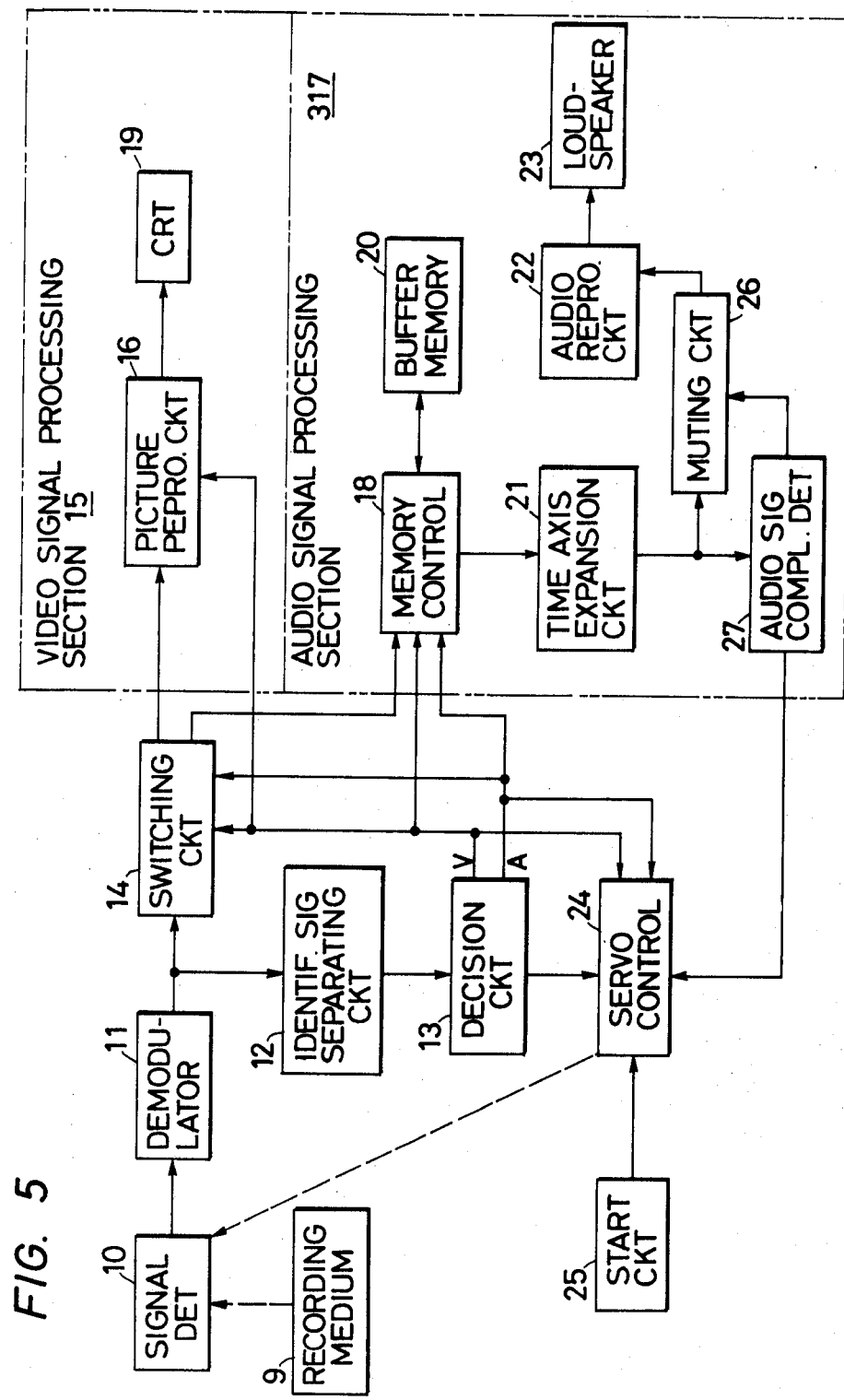
FIG. 5 is a block diagram of another reproducing device of the invention.
Figure 6:
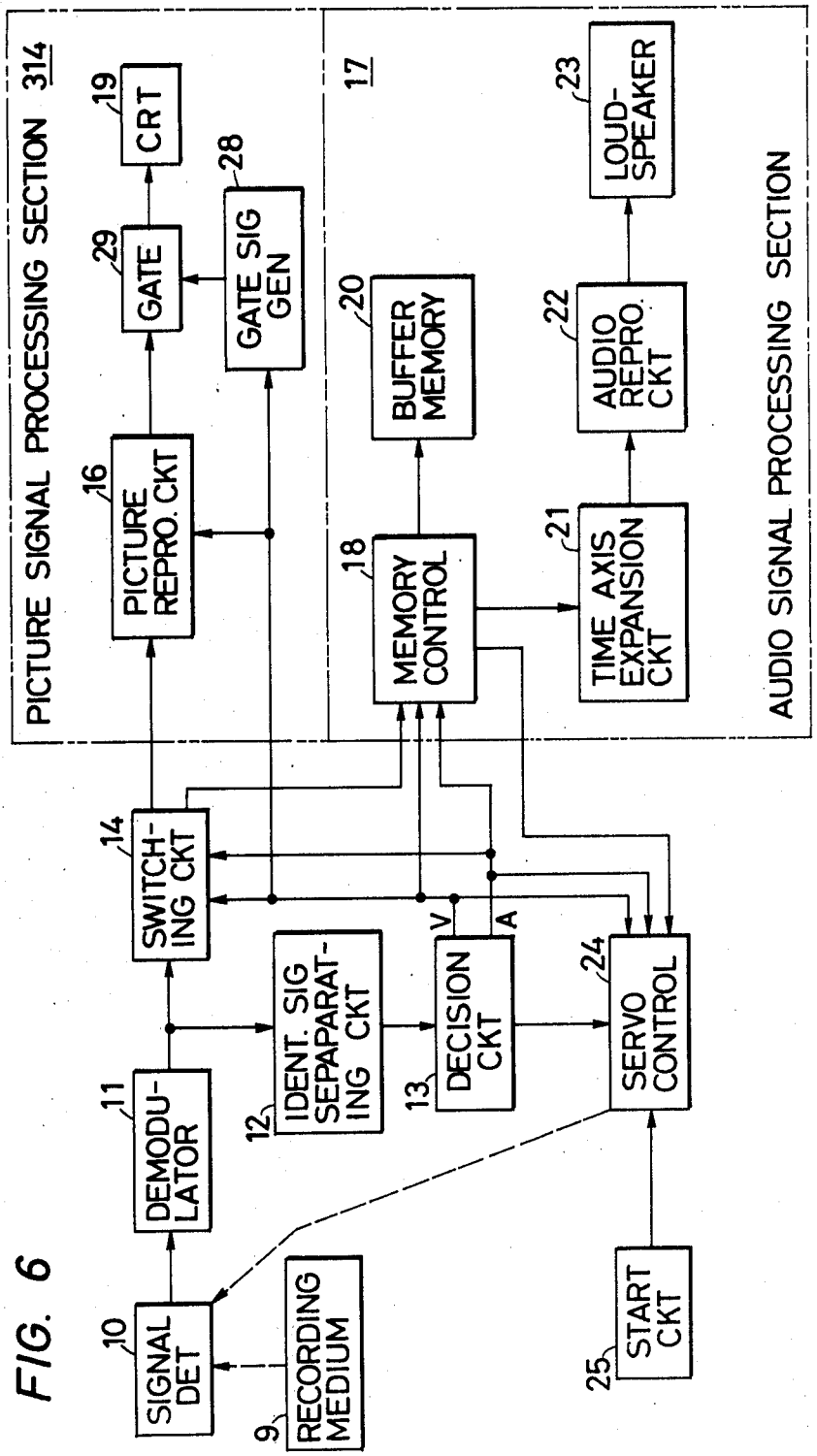
FIG. 6 is a block diagram of still another embodiment of a reproducing device of the invention.

In order to eliminate the above-described difficulties, second and third embodiments of the invention have been conceived which will be described with reference to FIGS. 5 and 6. In these embodiments, the audio signal and video signal reproduction operation can be carried out more smoothly. In FIGS. 5 and 6, those components which have been previously described with reference to FIG. 3 are therefore similarly numbered.

In the embodiment shown in FIG. 5, the audio signal processing section 317 includes a muting circuit 26 and an audio signal completion detecting circuit 27 which were not present in the first embodiment. An audio data signal from the time axis expansion circuit 21 is applied through the muting circuit 26 to the audio signal reproducing circuit 23 where it is converted into an audio signal which is reproduced by a loudspeaker 23. The output terminal of the time axis expansion circuit 21 is connected to the input terminal of the audio completion detecting circuit 27. This circuit 27 provides an audio completion signal when an audio signal completion indicating signal is present in the audio signal from the time axis expansion circuit 21. The audio signal completion thus produced is applied to the servo control circuit 26 and to the muting circuit 26. Upon receipt of the audio completion signal, the muting circuit 26 performs its muting operation, with suitable timing control, so as to avoid reproduction of unwanted audio signals.

The servo circuit 24 starts scanning the track of a recording medium 9 in response to a start signal from the start circuit 25. More specifically, during the period the A signal is being received, the scanning is successively carried out. However, when the V signal is received, the track of one frame is repeatedly scanned. Upon receipt of the audio completion signal, reproduction of the audio data corresponding to a series of audio frames has been completed at which time the servo control circuit controls the signal detecting means 10 so that instead of repetitive scanning, such operation is halted until the V signal is again received.

In the case where no audio signal completion indicating signal is included in the video format signal, the sound completion detecting circuit 27 may be so designed that the sound termination can be detected from the fact that no audio signal has arrived for a predetermined period of time.

In the above-described embodiment, the video signal detecting and reproducing operation is started immediately when the audio signal termination is detected. However, the embodiment may be so modified that the audio signal is repeatedly reproduced after detection of the audio signal termination. Furthermore, the embodiment can be variously modified. For instance, it may be so modified that the audio signal completion signal is used only for the muting operation while servo control is effected manually.

In addition, it is not always necessary to insert the audio signal completion indicating signal in the last of a series of audio frames. That is, if the signal is inserted in an intermediate one of a series of audio frames, then it can be used as an audio signal discontinuation signal.

In the third embodiment of the invention as shown in FIG. 6, a gate signal generating circuit 28 and a gate 29 have been added to the video signal processing section 15 of the first embodiment shown in FIG. 3. In this embodiment, the V signal is applied to the video signal producing circuit 16 and the gate signal generating circuit 28. The gate signal generating circuit 28 output is connected to the gate 29. The gate signal generating circuit 28 produces a gate pulse with appropriate timing in response to the V signal. The gate 29 is opened by the gate pulse so as to apply a drive signal to the cathode-ray tube (CRT) 19 at the appropriate times. The gate pulse is produced after operation of the picture reproducing circuit 16 has been synchronized. Therefore, the produced color picture is free from distortions such as color phase irregularity. After transferring predetermined segments of memory data from the buffer memory 20 to the time axis expansion circuit 21, the memory control circuit 18 produces a completion signal which is applied to the servo control circuit 24.

The content of the video format signal recorded on the above-described recording medium is not just a single frame of a motion picture or the like but is a plurality of frames of motion pictures or still pictures along with audio signals which have been subjected to time axis compression. Next, a reproducing device in accordance with the invention which can selectively reproduce a selected one data frame will be described.

Figure 7:
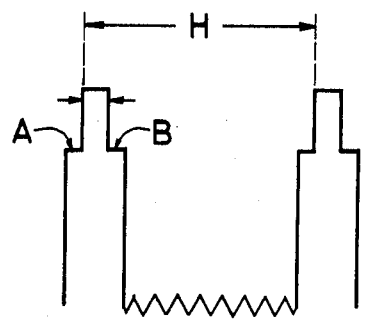
FIG. 7 is a wave form showing the position of insertion of an identifying signal within the systems synchronizing signal during the vertical blanking.

The reproducing device is so designed that an identification signal corresponding to the data which is carried by the data signal part of each field signal (or each frame when interlaced scanning is not used) of a video format signal is superimposed on a horizontal or vertical blanking signal portion of the corresponding data signal. The position of insertion of the identification signal preferably is in the vertical blanking period. However, it can as well be inserted in the front porch A or back porch B during the horizontal blanking period as shown in FIG. 7.

Figure 8:
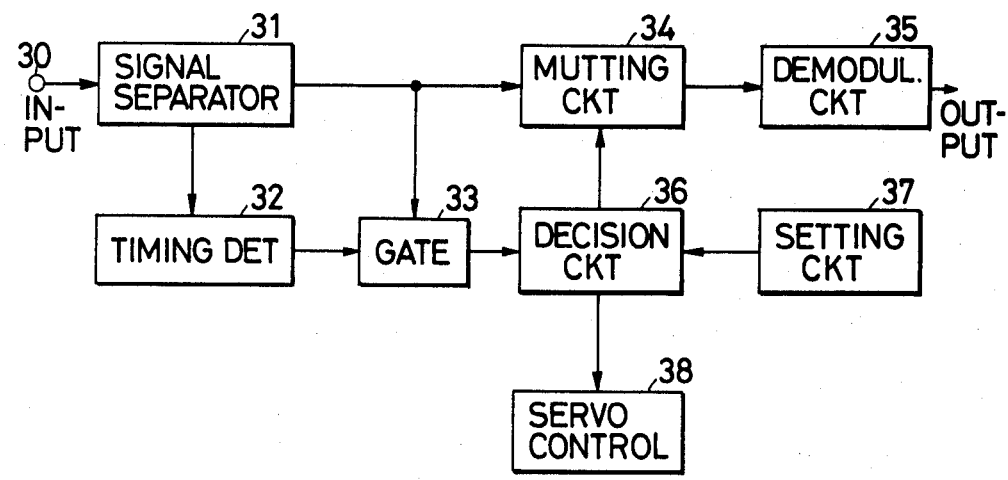
FIG. 8 is a block diagram of reproducing device capable of reproducing a designated single frame of data which was recorded by the device of FIG. 1.

FIG. 8 illustrates one example of a reproducing device which is capable of selectively reproducing, with the aid of the aforementioned identification signal, a desired frame of the data included in the video format signal which has been recorded by the recording device shown in FIG. 1.

In FIG. 8, a conventional video format signal detector (not shown) such as a VTR reproduction device applies a video format signal containing such an identification signal to an input terminal 30 and, accordingly, to a signal separation circuit 31. The signal separation circuit 31, which separates the synchronizing and blanking signals from the video format signal, applies the separated signals to a timing detection circuit 32. The timing detection circuit 32 provides a timing pulse when a predetermined position (for instance 10H or 11H) in the vertical blanking period or the position of the front or back porch is detected. The timing pulse thus provided is applied to a gate 33. Also, the signal separation circuit 31 supplies the data signal portion of the video format signal through a muting circuit 34 to a demodulation circuit 35.

The identification signal inserted in advance is provided at the output of the gate 33 and is applied to a decision circuit 36. In the decision circuit 36, a signal from a setting circuit 37 which corresponds to the desired frame is compared with the identification signal from the gate 33. When the identification signal is the desired one, the decision circuit releases the muting operation of the muting circuit so as to deliver the data signal to the demodulation circuit 35. Also, the decision circuit controls a servo control circuit 38 in the conventional video format signal detecting circuitry as described above. The video format signal detector reproduces only the desired data as set by the servo control.

In this connection, a reproduction system may be provided in which signals corresponding to frame numbers, or signals for identifying moving pictures and still pictures, or signals for identifying moving pictures, still pictures and sound are employed as the identification signals so that the reproduction mode may be switched according to the contents of the identification signal so as to perform the desired reproduction.

Devices for reproducing a video format signal which has been recorded by the recording device shown in FIG. 1 have been described. Next, another examplary embodiment of a recording device similar that of FIG. 1 will be described with reference to FIG. 9.

Figure 9:
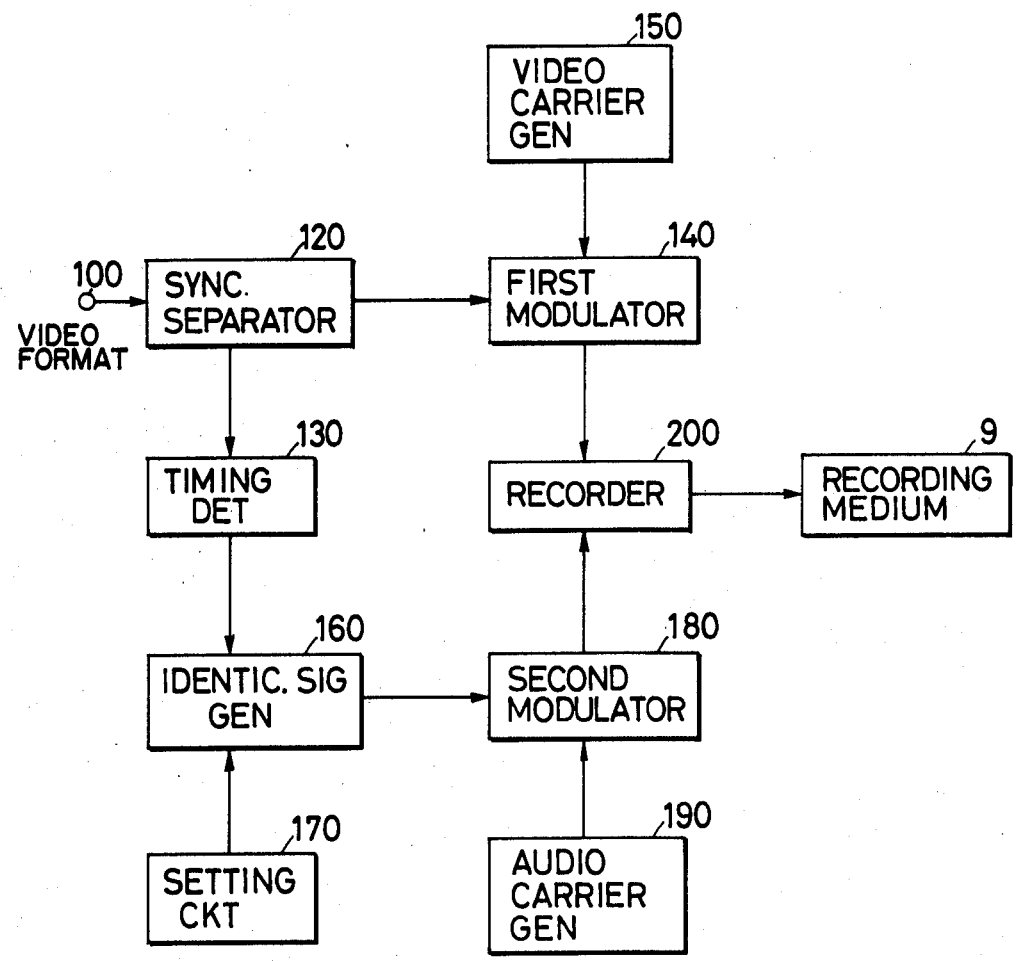
FIG. 9 is yet another embodiment of a recording device similar to that shown in FIG. 1.

In FIG. 9, a video format signal is applied to an input terminal 100 by a conventional video format signal generator. As described above, the video format signal is a series of frame signals including data signals such as vertical and horizontal synchronizing pulse signals, vertical and horizontal blanking signals, and video signals or audio signals which have been subjected to time axis compression. Each frame signal in general includes a pair of field signals.

The video format signal applied to the input terminal is supplied to a synchronous separation circuit 120. The synchronous separation circuit 120 applies the video format signal to a first modulation circuit 140 while supplying one or both of the synchronizing signal and blanking signal to a timing detection circuit 130. The first modulation circuit 140 subjects a video signal carrier from a video signal carrier generating circuit 150 to suitable modulation such as for instance FM modulation with the video format signal. The timing detection circuit 130 produces a timing pulse in response to the synchronizing signal or blanking signal with the timing pulse applied to an identification signal generating circuit 160. Circuit 160 generates identification signals corresponding to numerals, characters and symbols in accordance with instructions provided by a setting circuit 170, the identification signals being supplied to a second modulation circuit 180 in synchronism with the timing pulses. In the second modulation circuit 180, an audio signal carrier produced by an audio signal carrier generator circuit 190 is modulated with the identification signals. A recorder 200 simultaneously records the output signals of the first and second modulation circuits on a suitable recording medium such as a video tape or a video disc.

Figure 10:
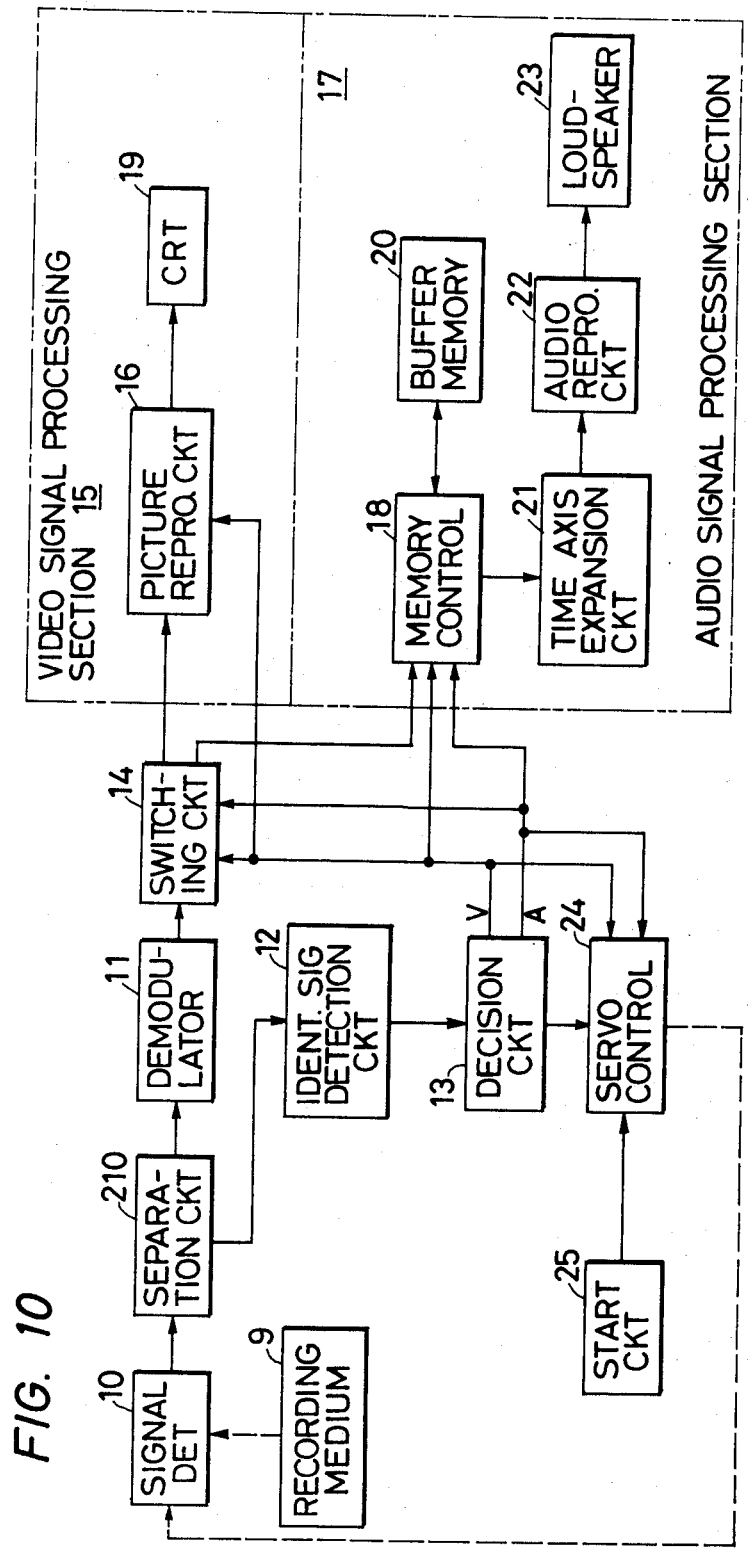
FIG. 10 is a block diagram of a reproducing device adapted for reproducing video format signals recorded with the device of FIG. 9.

A device for reproducing the video format signal which has been recorded by the recording device shown in FIG. 9 is shown in FIG. 10. The reproducing device shown in FIG. 10 is substantially similar to that shown in FIG. 5 with the exception that a separation circuit 210 is connected between the detection circuit 10 and the demodulation circuit 11 and the output of the separation circuit 210 is applied to the identification signal detection circuit 12. Of course, insertion of a muting circuit 26 and a sound completion detecting circuit 27 as in the embodiment shown in FIG. 5 can improve the quality of reproduced picture and sound.

The operation of the reproducing device of FIG. 10 will now be described. The signal detector 10 detects both the video signal carrier modulated with the video format signal, which has been recorded by scanning the recording medium 9, and the audio signal carrier modulated with the identification signal. The two carriers thus detected are applied to the separation circuit 210. The separation circuit 210 supplies signal components in the frequency band of the video signal carrier to the demodulation circuit 11 and supplies signal components in the frequency band of the audio signal carrier to the identification signal detecting circuit 12. The identification signal detecting circuit 12 detects the identification signal and applies the detected signal to the decision circuit 13. Depending on the contents of the identification signal, the decision circuit 13 produces as its output either a video data decision signal V or an audio data decision signal A. The switching circuit 14 supplies a video format signal from the demodulation circuit 11 to the picture reproducing circuit 16 in the video signal processing section 15. The switching circuit 14 delivers the video format signal to the memory control circuit 18 in the audio signal processing circuit 17 upon receipt of the A signal. For the period during which the picture reproducing circuit 16 receives the V signal from the decision circuit 13, the circuit 16 performs the reproduction operation by driving the display means 19 in accordance with the video format signal. On the other hand, for the period during which the memory control circuit 18 receives the A signal, the circuit 18 causes the buffer memory 20 to store the contents of the video format signal. The circuit 18 supplies the contents of the buffer memory 20 to the time axis expansion circuit 21 upon receipt of the V signal. The audio data signal from the time axis expansion circuit 21 is converted into an audio signal by the sound reproducing circuit 22 and the audio signal thus obtained is reproduced by the loudspeaker.

The servo control circuit 24 commences its operation and is synchronized in response to the start signal produced by the start circuit 25 and subsequently controls the scanning section drive mechanism of the detector 10 in accordance with the V or A signals.

In the above-described embodiment, the audio signal carrier is employed for recording the identification signal. However, with a VTR device or the like, an audio track different from a video track can be used as well.

Figure 11:
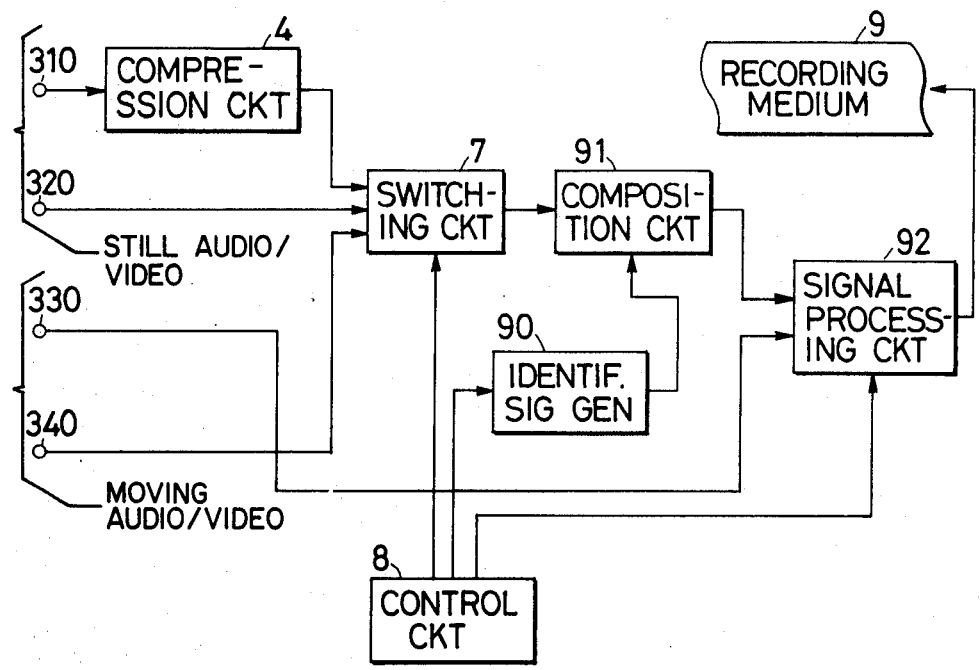
FIG. 11 is a block diagram of still another embodiment of a video format signal recording device of the invention.

FIG. 11 illustrates a third embodiment of a video format signal recording device according to the invention. Still picture audio and video data signals are applied to input terminals 310 and 320, respectively, while moving picture audio and moving picture video data signals are applied to input terminals 330 and 340, respectively.

The audio data applied to the input terminal 310 may be either an ordinary analog signal or a sampled signal produced by sampling the analog signal at set time intervals or still further a digital signal produced by quantizing the sampled signal. The signal is applied to a switching circuit 7 after being subjected to audio compression by an audio compression circuit 4. The still picture data, provided from an ordinary video format signal generator, is applied through the input terminal 320 to the switching circuit 7. Motion picture data from a video format signal generator similar to that described above is applied through the terminal 340 to the switching circuit 7 while the corresponding audio data is applied through the terminal 330 to the switching circuit 7.

In the case where the audio and video data are supplied suitably through the input terminals 310, 320 and 340, a setting circuit 8 controls the switching circuit 7 with the aid of a sequence controller such as a programmed microcomputer in accordance with the time sequence of the supplied data thereby to selectively apply the input signals at the input terminals 310, 320 and 340 of a composition circuit 91. It also controls an identification signal generating circuit 90 so that the identification signal of a signal thus selectively applied is inserted in the blanking portion of each frame in the composition circuit 91. Setting circuit 8 further controls a signal processing circuit 92 so that a compound video format signal from the composition circuit 91 is subjected to modulation and application of the motion picture audio data through the input terminal 330 is controlled and synchronized in accordance with the motion picture data. If the recording medium 9 is a video disc, then the modulation audio signal, mixed with a composite compound video format signal is recorded thereon. If the recording medium is a VTR, then the motion picture audio data is recorded on the audio track.

After being subjected to a predetermined preferred treatment by the signal processing circuit 92, the video format signal including the identification signal thus produced is recorded on the recording medium 9 such as a video tape or video disc. In order to reproduce video format signals recorded by the recording device shown in FIG. 11, circuits different from the demodulation circuit 11, identification signal separating circuit 12, decision circuit 13, switching circuit 14 and servo control circuit 24 in the reproducing device described above must be employed as the video and audio signals are recorded separately according to still and motion pictures.

A reproducing device for such signals will be described with reference to FIG. 12. In that device, the action of a demodulation circuit 11' is opposite that of the signal processing circuit 92 in the recording device of FIG. 11. Basically, it is the function of the demodulation circuit 11' to detect the video format signal including the identification signal. An identification signal separating circuit 12' separates the identification signal from the video format signal and supplies the identification signal thus separated to a decision circuit 13'. Depending on the contents (for instance, frame numbers, numerals, characters and symbols) of the identification signal, the decision circuit 13' produces either a motion picture data decision signal, a still picture data decision signal, or an audio data decision signal A. The MP, SP and A signals are provided at output terminals MP, SP and A, respectively.

Upon receipt of the MP signal or the SP signal, a switching circuit 14 couples the video format signal from the demodulation circuit 11' to a picture reproducing circuit 16 in the video signal processing section 15. Upon receipt of the A signal, the switching circuit 14 couples the video format signal to a memory control section 18 in an audio signal processing section 17. While either the MP signal or the SP signal is being received from the decision circuit 13', the picture reproducing circuit 16 drives the display means 19 to reproduce the video format signal as a disposed picture. The operation of the picture reproducing circuit 16 for the MP signal is fundamentally the same as that of the picture reproducing circuit 16 for the case of the SP signal.

When the A signal is received, the memory control circuit 18 transfers the contents of the video format signal to a buffer memory 20. Upon receipt of the SP signal, the memory control circuit 18 transfers the contents of the buffer memory 20 to the time axis expansion circuit 21. The output of the circuit 21 is converted into an audio signal by the sound reproducing circuit 22 with the audio signal being reproduced by a loudspeaker 23.

When predetermined memory data stored in the buffer memory 20 has been transferred to the time axis expansion circuit 20, the memory control circuit 18 produces a completion signal which is applied to a servo control circuit 24.

The servo control circuit 24, which starts in response to a start signal provided by a start circuit 25, controls a drive mechanism provided for scanning the recording medium 9 according to the MP, SP or A signal. Upon receipt of the MP signal, the servo control circuit 24 controls detector 10 so that the track of the recording medium is successively scanned. Upon receipt of the SP signal, the servo control circuit 24 controls the detector 10 so that a predetermined region of the track is repeatedly scanned. Finally, upon receipt of the completion signal from the memory control circuit 18, the servo control circuit 24 controls the detector 10 so that a region following the predetermined region is scanned.

Figure 14:
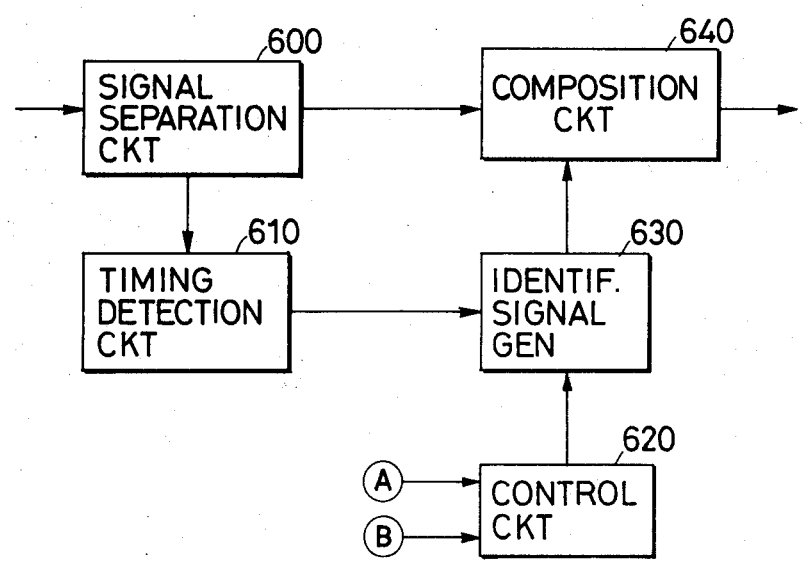
FIGS. 13 and 14 taken together are a block diagram of a color video format signal recording device in which the frequency and phase of a sub-carrier signal are maintained at stable values.

Next, a color video format signal recording device will be described with reference to FIGS. 13 and 14. In order to maintain the frequency and phase of a subcarrier required for reproduction of a color video signal at stable values, a color burst signal is required which is inserted into the horizontal blanking portion of a frame bearing a video format signal color video signal. Such a color burst signal is of course not present in an audio data frame. Accordingly, during the initial reproduction operation of a color video frame following such an audio data frame, the operation of the subcarrier supplying circuit will unstable for lack of synchronization and, accordingly, color phase irregularities are likely to occur in the reproduced picture. To overcome this problem, the embodiment shown in FIGS. 13 and 14 is so devised that the color burst signal is inserted in the audio frame also.

Figure 13:
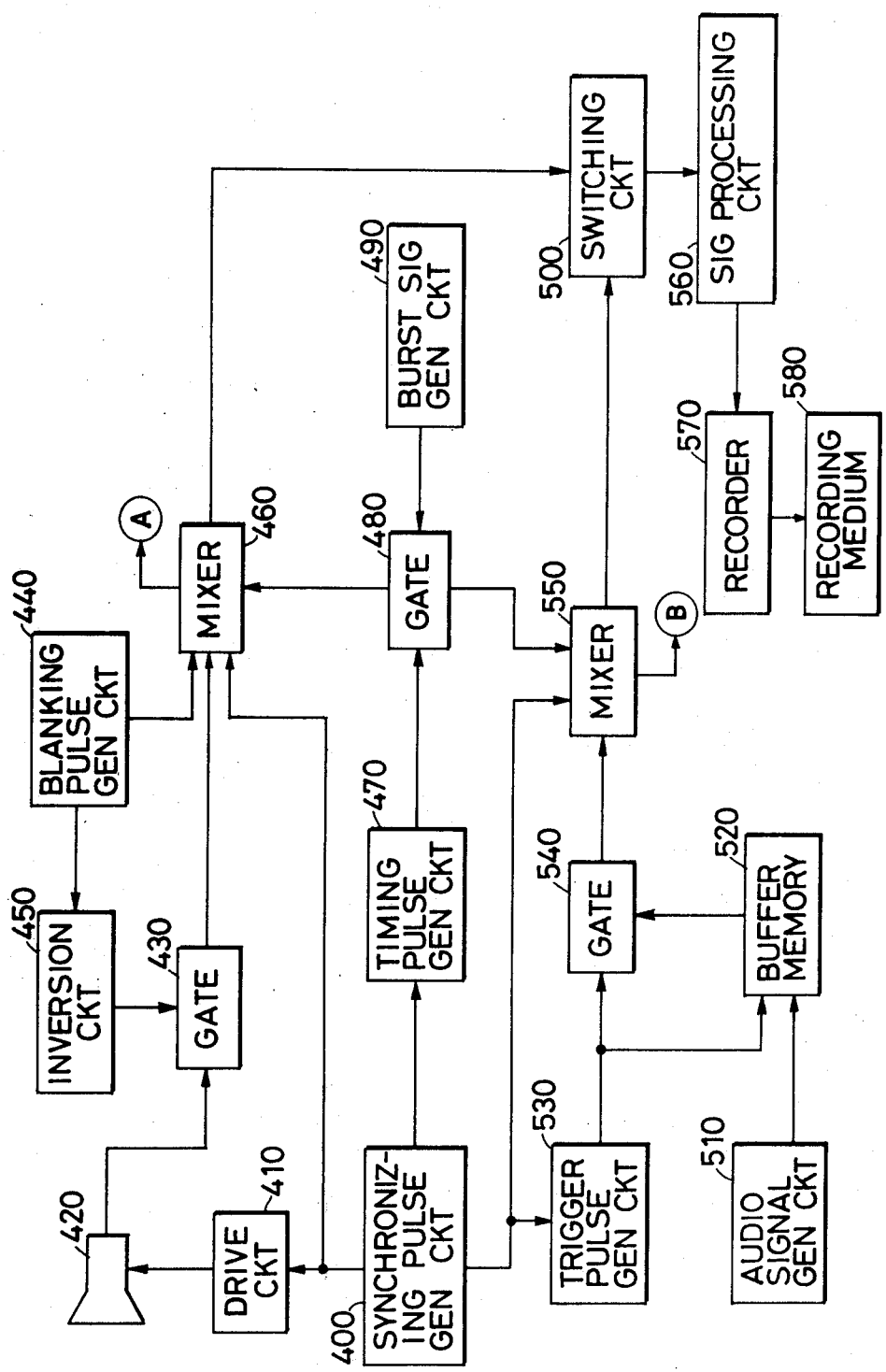

In FIG. 13, a synchronizing pulse generator 400 generates vertical and horizontal synchronizing pulses. A drive circuit 410 drives video signal generating means 420 such as an image pickup tube in response to the synchronizing pulses. A gate 430 supplies the output of the image pick-up tube 420 to a mixer 460 in response to a pulse which is applied to the gate through an inversion circuit 450 from a blanking pulse generating circuit 440.

A timing pulse generating circuit 470 generates timing pulses in response to the synchronizing pulses. A gate 480 delivers a color burst signal from a burst signal generating circuit 490 to the mixer 460 in response to the timing pulse. In the mixer 460, the video signal, synchronizing signals, blanking signal and color burst signal are mixed to form a color video signal which is applied to a switching circuit 500.

An audio signal from an audio signal generating circuit 510 is in a buffer memory 520 which is operated in accordance with trigger pulses which are produced by a trigger pulse generator circuit 530 in response to the synchronizing signal. The audio signal thus stored is subjected to time axis compression and then coupled to a mixer 550 through a gate 540 which is triggered by the trigger pulse from the trigger pulse generating circuit 530. In the mixer 550, the audio signal which had been subjected to time axis compression is mixed with the synchronizing pulses and the color burst signal to form a video format signal bearing audio data. The video format signal thus formed is applied to the switching circuit 500. The switching circuit 500 alternately supplies the color video signal and the video format signal to a signal processing circuit 560 with the signals being supplied for each of a predetermined desired number of frames. The signal processing circuit 560 subjects the signal applied thereto to a desired type of processing such as FM modulation and the signal thus processed is applied to a recorder 570 where it is recorded on a recording medium 580.

Shown in FIG. 14 is an identification signal inserting circuit which is adapted to be connected between the switching circuit 500 and the signal processing circuit in the recording device illustrated in FIG. 13. In the case where a video format signal is made up of motion picture, still picture and audio data frames irregularly arranged, it is necessary to employ identification signals so that reproduction is correctly effected by the reproducing device. The identification inserting circuit is provided to insert such an identification signal in each frame of the video format signal.

The identification signal inserting circuit includes a signal separating circuit 600 for separating synchronizing pulses from the video format signal provided by the switching circuit 500, a timing detection circuit 610 for generating timing pulses corresponding to the synchronizing pulses thus separated, an identification signal generating circuit 630 for generating a suitable identification signal in accordance with an instruction from the setting circuit 620 and in response to the timing pulse, and a composition circuit 640 for combining the identification signal and the video format signal.

Figure 12:
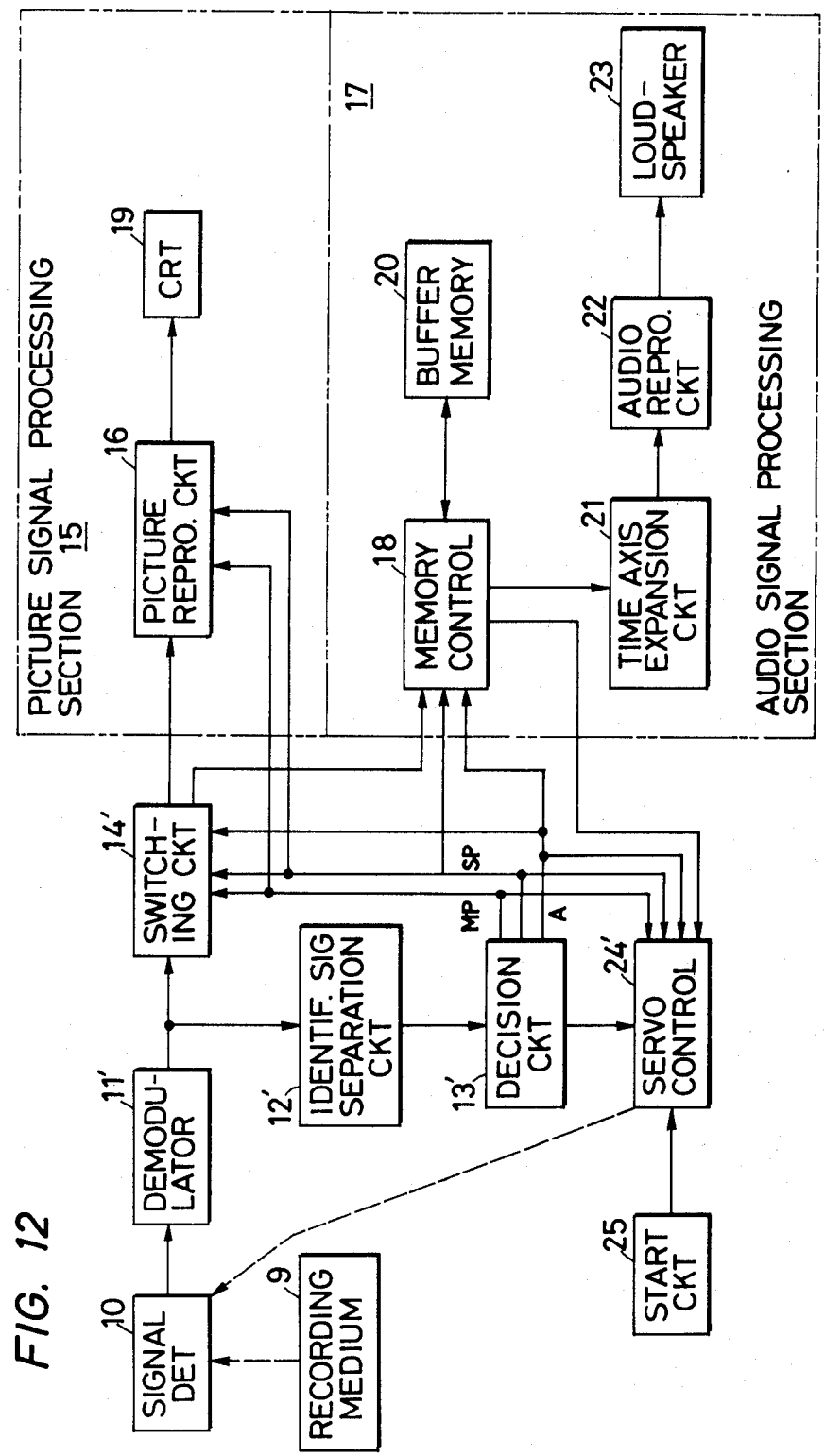
FIG. 12 is a block diagram of a reproducing device for reproducing video format signals recorded by the device of FIG. 11.

The data recorded by the recording circuit shown in FIGS. 13 and 14 can be reproduced by the reproducing circuit 16 shown in FIG. 12. In the picture reproducing circuit 16 in FIG. 12 as even the audio frame includes the color burst signal, the operation of the picture reproducing circuit 16 is stable at all times and accordingly the color picture can be correctly reproduced.

Figure 15:
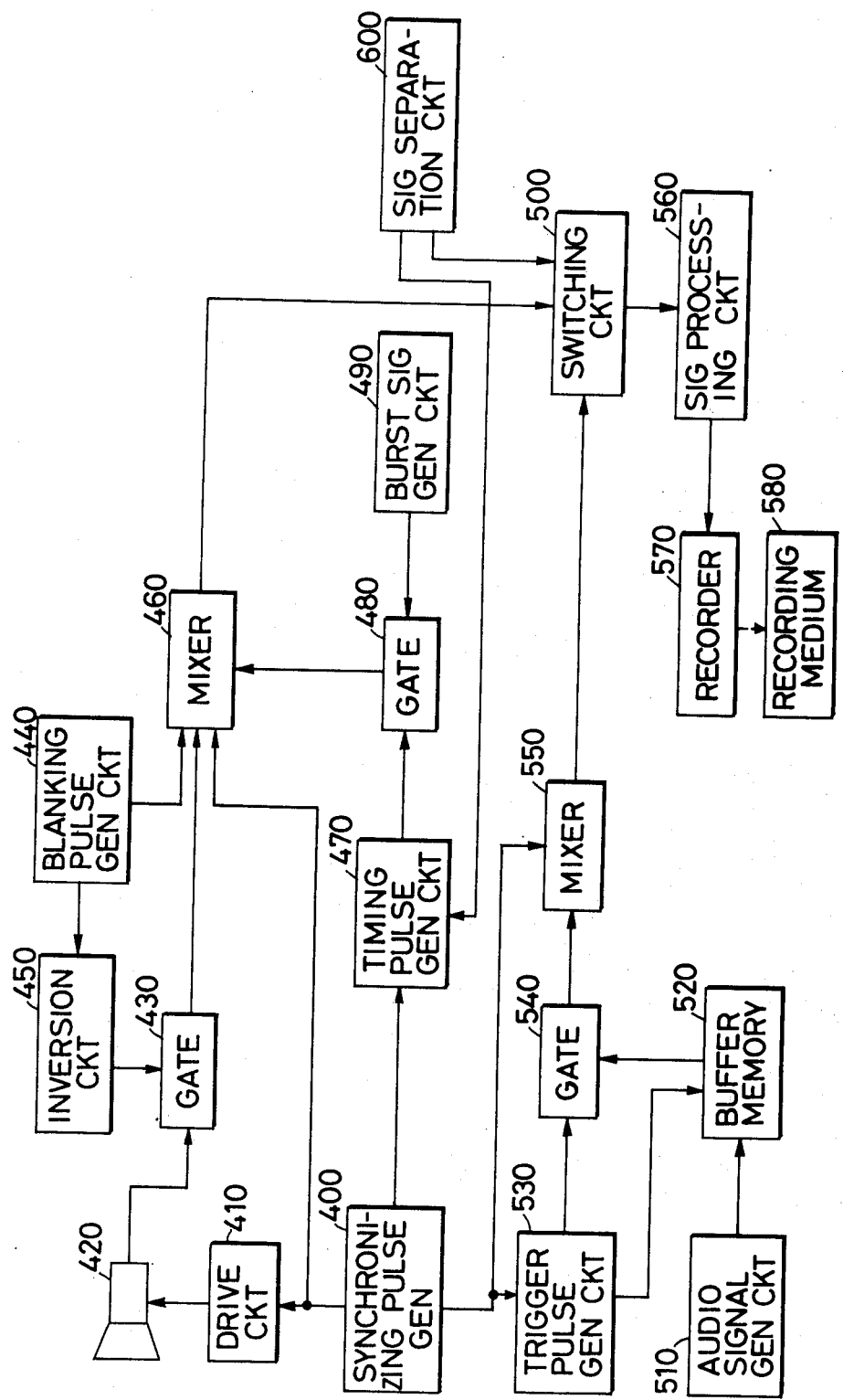
FIG. 15 is a block diagram of another embodiment of a color video format signal recording device of the invention.

FIG. 15 illustrates another example of the color video format signal recording device according to the invention. The recording device is substantially similar to that shown in FIG. 13. In FIG. 15, those components which have been previously described with reference to FIG. 13 are therefore similarly numbered.

However, in FIG. 15, a timing pulse generating circuit 470 generates timing pulses in response to the above-described synchronizing pulses and to signals which are provided by an identifying circuit 600 which specifies whether motion pictures or still pictures are being processed. The timing pulses open a gate 480 for different periods of time with predetermined timing. The gate 480 supplies a color burst signal from a burst generating circuit 490 to a mixer circuit 460. Color burst signals containing different numbers of cycles are instead in the black porches of the horizontal blanking parts of the motion picture frame and the still picture frame. For instance, a color burst signal having 8 cycles is inserted in the back porch of the horizontal blanking portion of the motion picture frame while a color burst signal having 10 cycles is inserted in the back porch of the horizontal blanking portion of the still picture frame. In the mixer circuit 460, the video signal, synchronizing signals, blanking signals and color burst signal are mixed to form a color video signal which is applied to a switching circuit 500.

Figure 16:
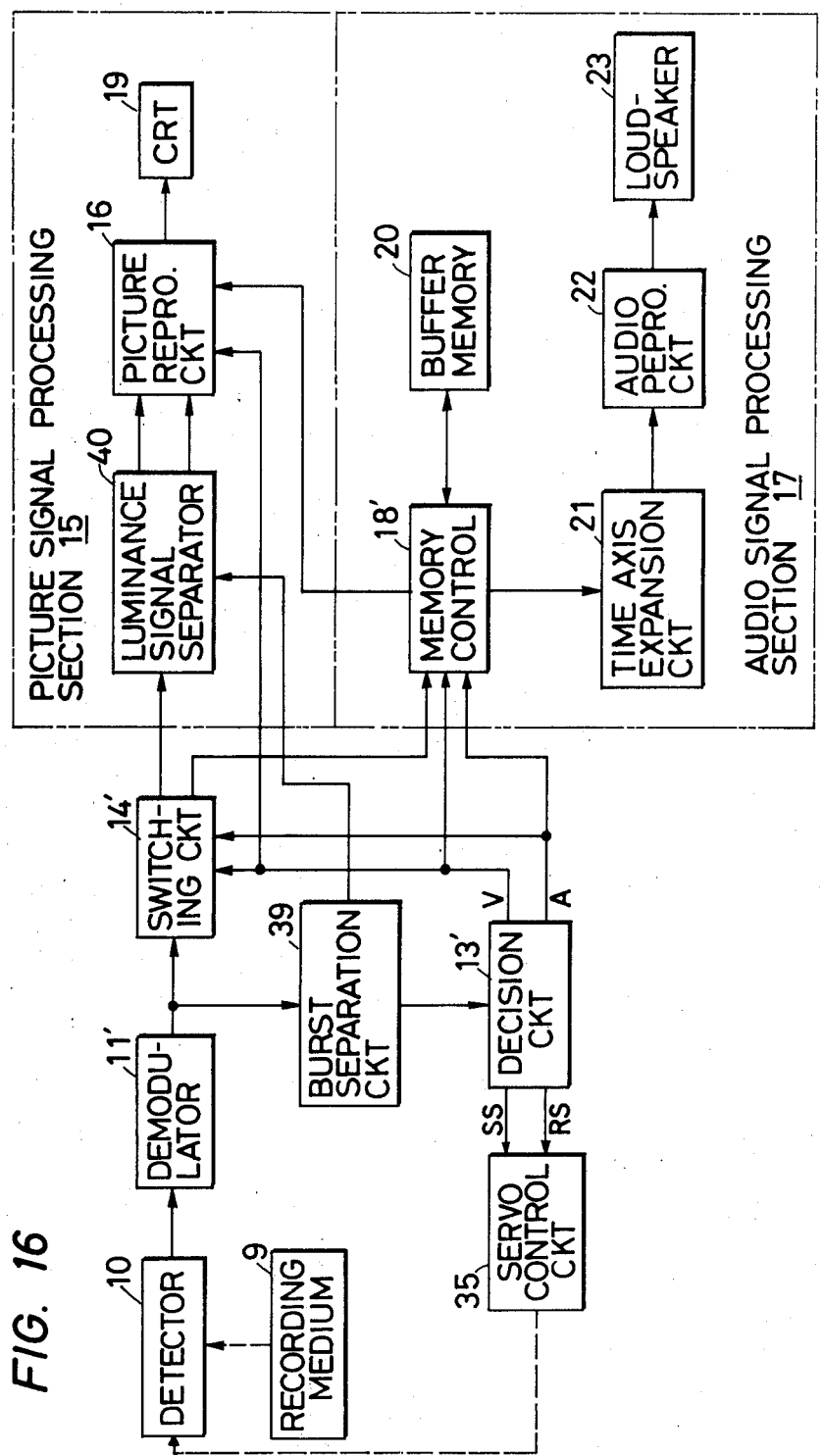
FIG. 16 is a block diagram of a reproducing device for reproducing video format signals recorded by the device of FIG. 15.

FIG. 16 illustrates a yet further example of the color video format signal reproducing device where the detector 10 detects the color video format signal, which has been recorded on the recording medium 9 by the use of the recording device as shown in FIG. 15, after modulation. The detected color video format signal is supplied to the demodulation circuit 11'. The operation of the demodulation circuit 11' is opposite to that of the signal processing circuit 560 in the recording device shown in FIG. 15. It delivers the color video format signal to switching circuit 14' and a burst separation circuit 39 The burst separation circuit 39 operates to separate the color burst signal from the color video format signal which is supplied to the decision circuit 13' and the luminance signal separation circuit 40 in the picture signal processing section 15. Upon receipt of the color burst signal, the decision circuit 13' produces a video information decision signal on its output terminal V. Conversely, if no color burst signal is received, the decision circuit 13' produces an audio information decision signal on its output terminal A.

The switching circuit 14' delivers the color video format signal supplied from the demodulation circuit 11' to the luminance signal separation circuit 40 when it receives the V signal. Upon receipt of the A signal, the switching circuit 14' supplies the color video format signal to a memory control circuit 18' included in the audio signal processing station 17.

The luminance signal separation circuit 40 regulates the frequency and phase of a subcarrier to separately supply the luminance signal and the chrominance signal to the picture reproducing circuit 16 in response to the color burst signal from the burst separation circuit 39.

Upon receipt of the A signal, the memory control circuit 18' causes the buffer memory 20 to store the video format signal including the sound information. Subsequently, when the memory control circuit 18' receives the V signal, the content stored in the buffer memory 20 is read out and delivered to the time axis expansion circuit 21. In the time axis expansion circuit 21, the input signal supplied from the memory control circuit 18' is subjected to time axis expansion and is applied to the sound reproducing circuit 22.

Moreover, the decision circuit 13' counts the number of cycles of the color burst signal in order to generate a sequential scanning signal (hereinafter referred to merely as an SS signal) or a repeated scanning signal (hereinafter referred to merely as an RS signal) which is applied to the servo control circuit 35. Upon receipt of the RS signal, the servo control circuit 35 operates the detector 20 to repeatedly scan a predetermined interval of track on the recording medium. In contrast, upon receipt of the SS signal, it controls the detector 20 so as to sequentially scan the track. That is, when a frame to be reproduced as a still picture is supplied from the demodulation circuit 11, the decision circuit 13' produces the RS signal. When a frame to be reproduced as a motion picture or a sound is supplied, the decision circuit 13' produces the SS signal.

As is apparent from the above description, according to a color video format signal recording and reproducing device of the invention, without a separate discriminating signal, discrimination among motion picture frames, still picture frames and sound frames can nonetheless be accomplished.

What is claimed is:

1. A video format signal recording device for recording a video format signal on a recording medium comprising: means for inserting an identification signal in a blanking portion of each frame of said video format signal, said identification signal identifying whether data within a corresponding frame is video data or audio data, wherein said identifying signal inserting means comprises means for inserting a first video identifying signal corresponding to motion picture data means for inserting a second video identifying signal corresponding to still picture data, and wherein said first and second video identifying signals comprise first and second numbers of cycles of a color burst signal.

2. The video format signal recording device of claim 1 further comprising means for inserting a color burst signal in frames corresponding to audio data.

3. A video format signal reproducing device comprising means for detecting a video format signal including an identification signal recorded on a recording medium, means for separating said identification signal from said video format signal; decision means for providing video data decision signal or an audio data decision signal according to said identification signal thus separated; video signal processing means for reproducing video portions of said video format signal; audio portions of said video format signal; switching means for supplying said video format signal to said video signal processing means and said audio signal processing means separately in response to said video data decision signal and said audio data decision signal; means for counting the number of cycles of a color burst signal; and means for repeatedly scanning the recording medium in a mode for reproducing still picture data in response to a first count output of said counting means and means for sequentially scanning the recording medium in a mode for reproducing motion picture data for a second count output of said counting means.

4. The video signal reproducing device of claim 3 further comprising control means for controlling said signal detecting means in response to said video data decision signal and said audio data decision signal.

5. The video format signal reproducing device of claim 3 further comprising means coupled to said audio signal processing means for muting an output audio signal while no audio data decision signal is present.

6. A video format signal recording and reproducing device for recording a video format signal on a recording medium in a recording mode and for playing back signals so recorded in a reproducing mode comprising: means for inserting an identification signal in a blanking portion of each frame of said video format signal as it is recorded in said recording mode, said identification signal identifying whether data within a corresponding frame is video data or audio data; means for detecting said identification signal in said playback mode; means for producing a video data decision signal or an audio data decision signal according to said identification signal thus separated; video signal processing means for reproducing video portions of said video format signal; audio signal processing means for reproducing audio portions of said video format signal; and switching means for supplying said video format signal to said video signal processing means and said audio signal processing means separately in response to said video data decision signal and said audio data decision signal, said identification signal being based, at least in part, on the number of cycles of a color burst signal in said blanking portion.

7. The device of claim 6 wherein the number of cycles of said color burst signal identifies said video format signal as one of motion picture data and still picture data.

8. The device of claims 6 or 7 wherein said color burst signal is inserted in the back porch of the horizontal blanking portion of said corresponding frame.

9. The device of claims 1, 3 or 7 wherein said color burst signal is inserted for both video data and audio data, whereby no loss of color synchronization occurs upon the processing of audio data.

* * * * *